May 8, 1962 W. W. PATTERSON III, ET AL 3,033,531
HYDRAULIC WINCH
Filed Nov. 15, 1957 6 Sheets-Sheet 1

INVENTORS.
William W. Patterson, III
Eugene F. Grapes
BY
Webb, Mackey & Burden
THEIR ATTORNEYS INVENTORS.
William W. Patterson, III
Eugene F. Grapes
BY Webb, Mackey & Burden
THEIR ATTORNEYS

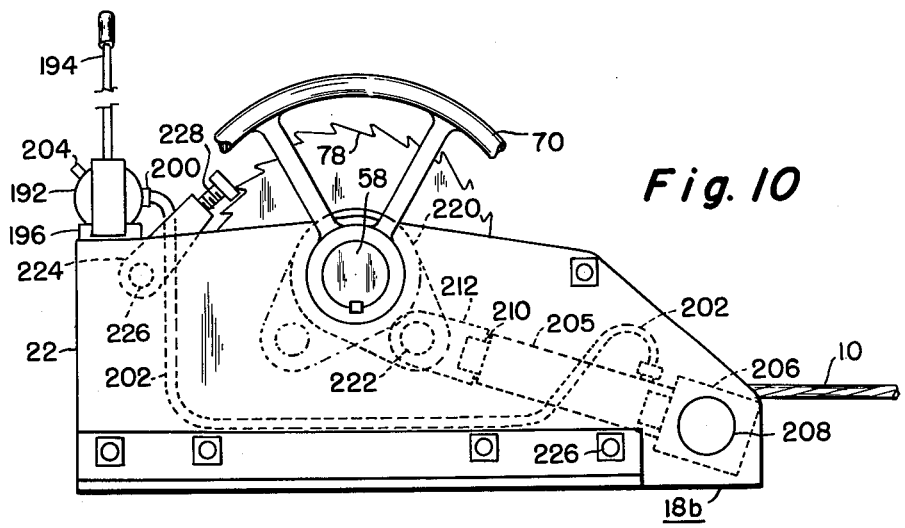
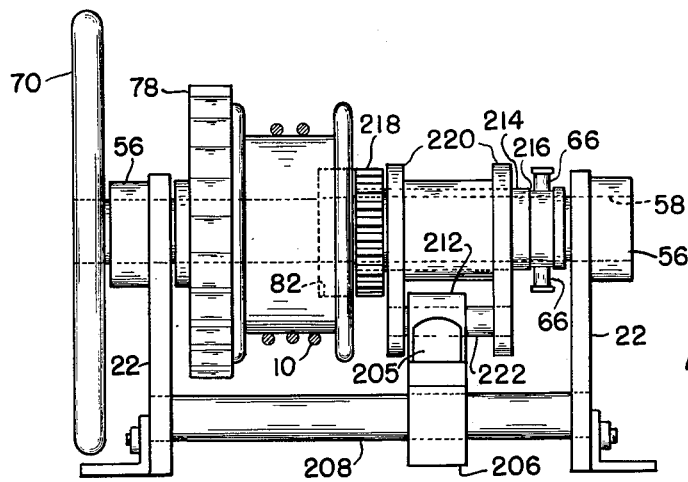
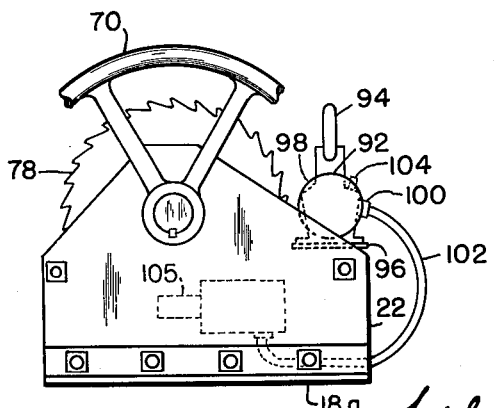

INVENTORS.
William W. Patterson, III
Eugene F. Grapes
BY Webb, Mackey & Burden
THEIR ATTORNEYS May 8, 1962 W. W. PATTERSON III, ET AL 3,033,531
HYDRAULIC WINCH
Filed Nov. 15, 1957 6 Sheets-Sheet 6
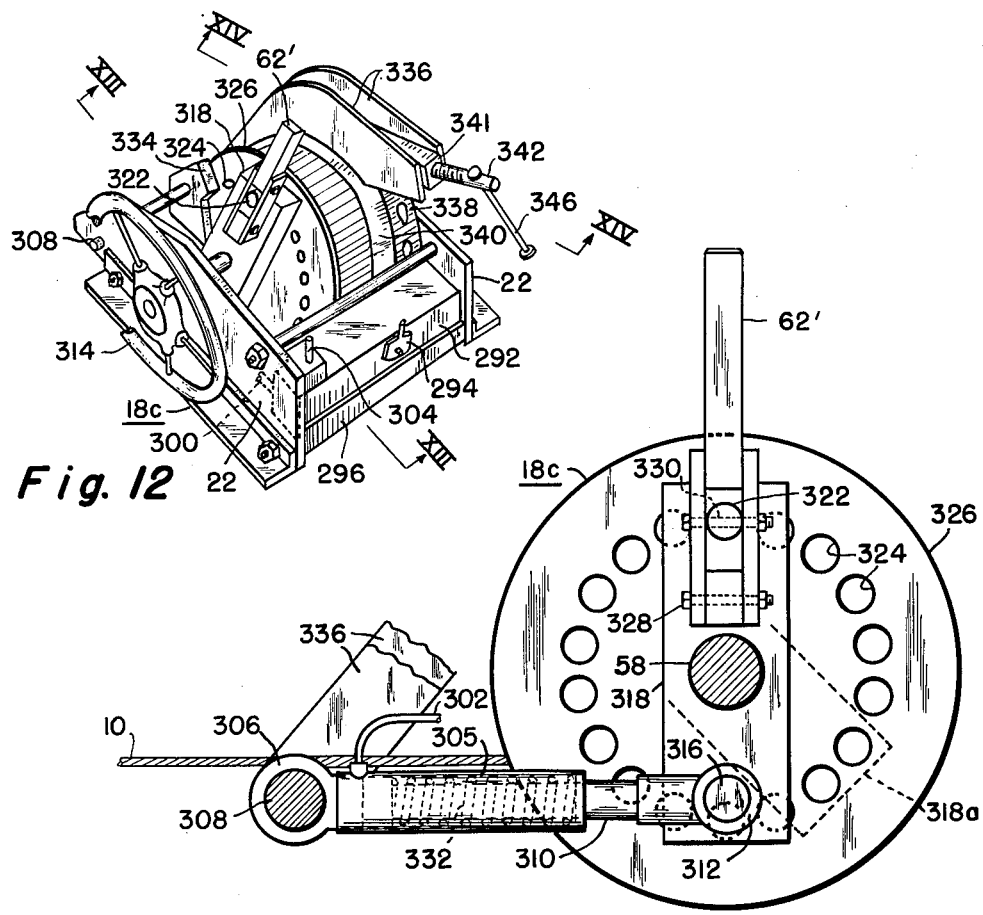
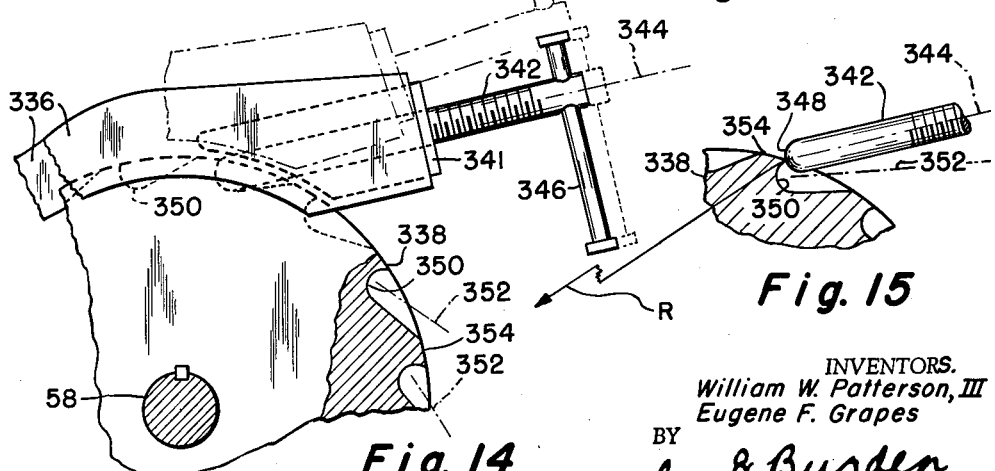
INVENTORS.
William W. Patterson, III
Eugene F. Grapes
BY
Webb, Mackey & Burden
THEIR ATTORNEYS

United States Patent Office 3,033,531
Patented May 8, 1962

3,033,531
HYDRAULIC WINCH
William W. Patterson III, Coraopolis, and Eugene F. Grapes, Irwin, Pa., assignors to W. W. Patterson Co., Pittsburgh, Pa., a corporation of Pennsylvania
Filed Nov. 15, 1957, Ser. No. 696,816
5 Claims. (Cl. 254—187)

This invention relates to a hydraulic winch, particularly a winch for winding-in barge cable in which slack on that cable is readily taken up by hand before hydraulic power is applied to wind-in the cable with maximum pulling action.

In certain types of marine tow work, short lengths of cable are commonly used to secure a group of several barges to one another and to a common tow boat provided for the group. The tension in the individual cable connectors runs as high as 15,000 pounds or more in order to make the barges abut solidly without excessively chafing and the required size of wire cable (1" or 1¼") necessary for this tension has considerable weight. A winch drum of fairly large size and load capacity must, therefore, be provided for each cable and generally the drums on mechanical hand winches of conventional design have proved altogether inadequate or sufficiently unsatisfactory that the operation is a difficult one.

The present invention largely eliminates the foregoing difficulty by providing a hydraulic winch for work of the above type in which the winch drum is initially turned by hand under a minor mechanical advantage merely to take out the slack and in which a hand or foot pump is then operated to build up pressure on a hydraulic system so as to apply a greatly multiplied hydraulic force for turning the drum to its final position exerting maximum pull. A release type control valve of conventional construction is provided in the hydraulic system and is operated for immediate relief of built-up hydraulic pressure in a way to afford quick relief action on the cable which is highly desirable for safety reasons and otherwise in tow work.

More specifically, a hydraulic winch illustrating one preferred embodiment of our invention includes a reel shaft which is arranged with a cable reel or drum fast thereto and with a rack pinion which independently turns and slides on the shaft adjacent the reel, and further includes a hand wheel of large diameter made fast to that shaft and a hand pump lever which is hydraulically connected through a pump and a complete hydraulic system to drive a sliding rack which is provided to mesh with the rack pinion.

The rack pinion is piloted by the shaft to oscillate and slide as indicated and teeth thereon slide into and out of engagement with a companion set of internal teeth provided in the side of the reel. Therefore, a positive toothed driving engagement between the cable reel and the sliding rack which turns it is afforded solely by portions of the same single set of oscillating pinion teeth. The direct drive isolates the reel shaft and its keyed or splined connection to the reel from torsional strain.

In two illustrated embodiments we provide modified oscillatable members on said shaft for driving the cable reel, each adapted to be driven by a crank shaft type or crank arm type of direct driving connection from a ram in the hydraulic system and one carrying a pinion portion engageable with the reel in the preceding manner and the other carrying a dog clutch engageable with openings in the side of the reel. In common these embodiments take advantage of the 90% efficiency characteristic of hydraulic systems and, accounting for friction and other system losses, the present devices nevertheless physically deliver 15,000 pounds of cable tension with a 50 pound operator input thrust which is especially significant compared to strictly mechanical devices such as screw type winches which, due primarily to their inherent friction, operate at approximately 30% efficiency.

This invention further provides a pawl-engaging wheel affixed to the cable reel and several novel types of pawl mechanism which cooperate therewith to lock the reel without backlash and which for this purpose have unique features of adjustment and disengagement whereby the pawl is brought into an exactly aligned position of solid engagement with a confronting portion on the wheel in all positions and at any time may be released under load without difficulty.

We show certain preferred embodiments of the invention in the accompanying drawings in which:

FIGURE 1 is a plan view of a tow boat and barge arrangement employing hydraulic winches according to the present invention;

FIGURES 2, 3, and 4 are views showing the hydraulic winch in side elevation, in rear end elevation, and in top plan, respectively;

FIGURE 6 is a view similar to FIGURE 2, but showing a modification;

FIGURES 10 and 11 are views similar to FIGURES 2 and 3, respectively, but showing a further modification;

FIGURE 12 is an isometric view generally similar to FIGURE 4 but showing a further modification;

FIGURES 13 and 14 are section views taken along the transverse section lines XIII—XIII and XIV—XIV of the modification of FIGURE 12; and FIGURE 15 is a view similar to FIGURE 14 but with portions thereof omitted for clarity.

Figure 1:
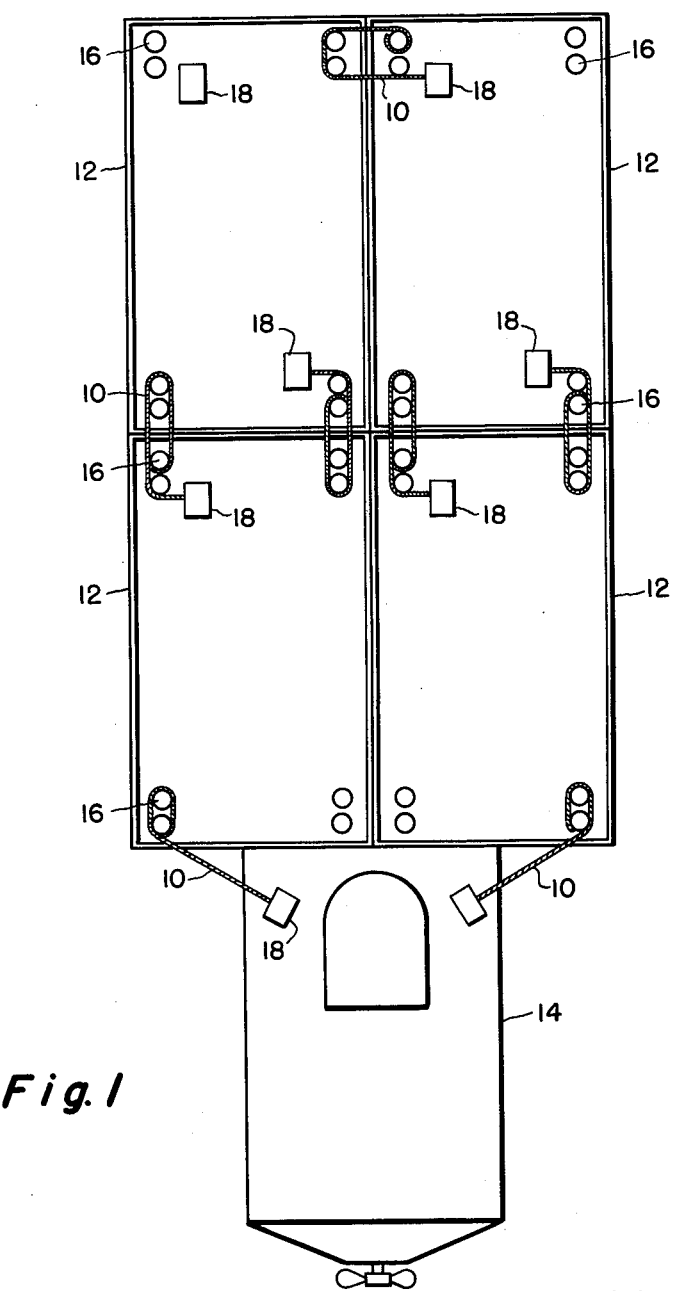
Figure 2:
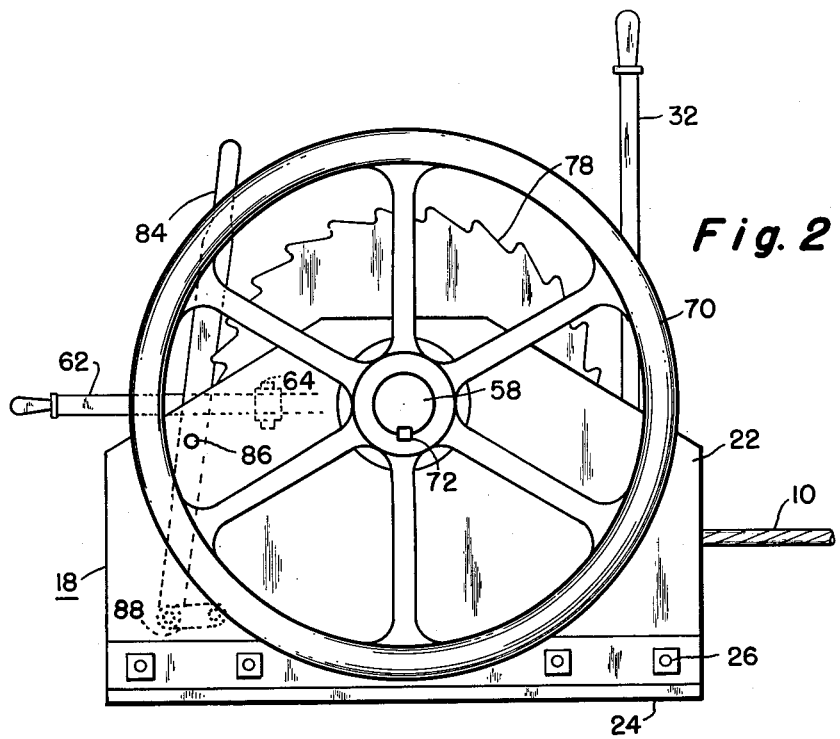
Figure 3:
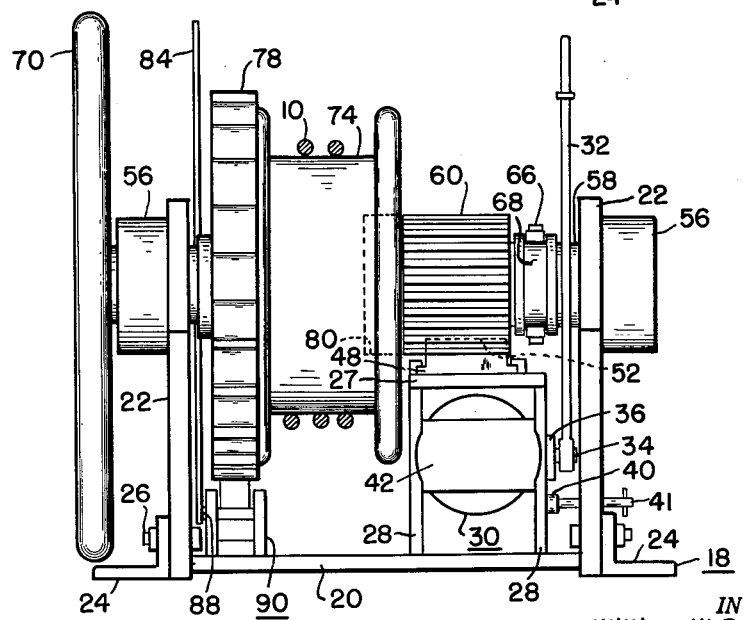
Figure 4:
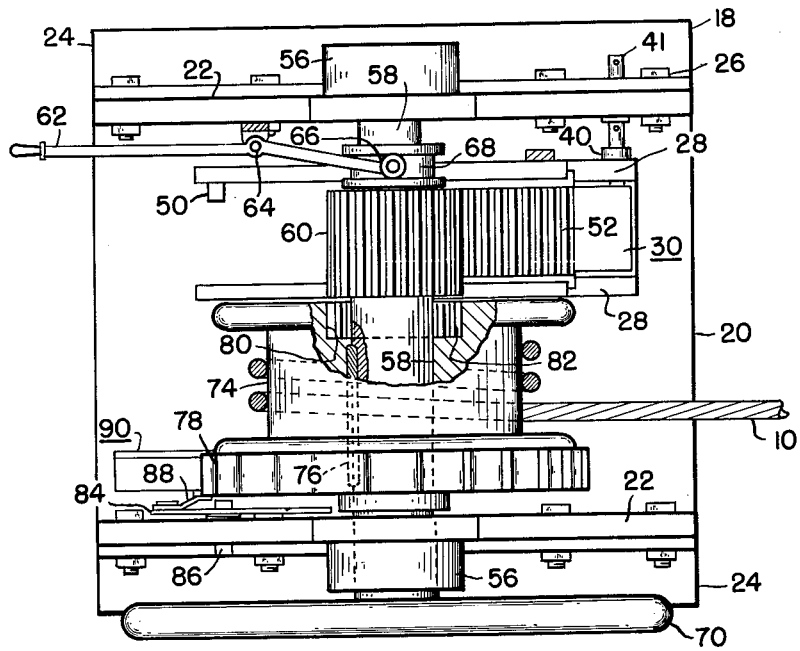
Figure 5:
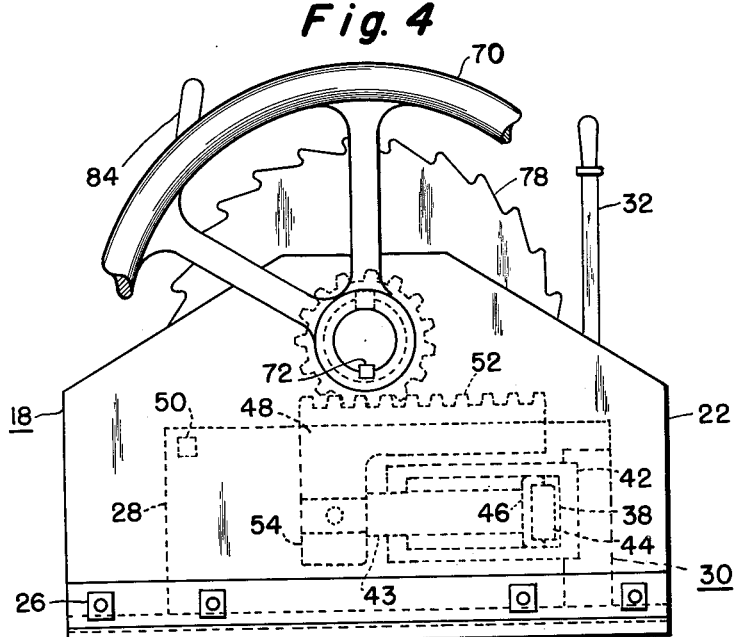
FIGURE 5 is similar to FIGURE 2, but showing certain parts removed for the sake of clarity.

In the drawings, individual lengths of wire cable 10 are shown in various locations securing a group of several barges 12 to one another and to a common tow boat 14 provided for pushing the group.

According to the invention the end length of each cable is passed about one or several deck bitts 16 secured to each barge 12 and is placed in tension through a hydraulic winch 18, three embodiments of which are shown in FIGURES 2–5, 6 and 10.

In FIGURES 2 through 5, the winch 18 has a generally upright main frame composed of a base plate 20 and a vertical pair of spaced side plates 22 secured along the bottom edge to the base plate 20. A pair of deck engaging angle bars 24 is bolted at 26 to the respective side plates 22 to fasten the main frame to a deck or other supporting surface by means of welds or hold-down bolts (not shown). A subframe formed of an upper tie plate 27 and a pair of spaced vertical side plates 28 is secured to the top of the base plate 20 to hold an integral pump and hydraulic cylinder device 30. The device 30 carries a pump handle 32 secured to a shaft 34 of a pump 36 which has a reservoir connected inlet (not shown) and an outlet directly connected to the interior of a single acting ram cylinder 38. The pump 36 has a release valve within the combined pump and cylinder device actuated by a valve stem 40 and a handle 41 providing for the immediate relief of pressure in the ram cylinder 38 at the will of the operator. The ram cylinder 38 is longitudinally disposed in the hydraulic winch and has a closed rear end which fits in a reaction yoke 42 which is firmly secured to the side plates 28 in the subframe. A ram 43 protrudes through the forward end of the ram cylinder 38 and carries a cylindrical piston 44 and a seal 46 therefor which slides in the cylinder 38.

The side plates 28 in the subframe support and guide a slide 48 which moves between the upper tie plate 27 which forms a rear stop for the slide and a front stop 50 at the forward end of one of the side plates 28. The slide 48 carries a rack 52 and has a depending lug 54 at the forward end which engages the front end of the ram 43 for hydraulically driving the rack 52.

The side plates 22 in the main frame carry a pair of aligned bearings 56 at their upper end portions which journal a transverse shaft 58 for rotation in the main frame. The shaft 58 carries a slide gear or pinion 60 which constantly meshes with the rack 52 and which turns and slides relative to the shaft 58.

A hand clutch lever 62 is pivoted at 64 to one of the side plates 22 to fulcrum about its midportion. A clutch fork 66 formed at the inner end of the hand clutch lever 62 has a pin groove connection to a grooved extension 68 carried by the slide gear 60 for shifting the latter with the teeth thereof sliding along the companion teeth on the rack 52.

A hand wheel 70 of relatively large diameter has its hub keyed at 72 to one end of the shaft 58. A cable drum or reel 74 of predetermined diameter about half that of the hand wheel 70 is keyed at 76 to the shaft 58 and it carries a thick ratchet wheel 78 cast integrally with one of the opposite flange portions provided thereon. A length of approximately 70 feet of one-inch wire cable 10 is wrapped around the reel 74 in the space defined between its flange portions with the resulting mechanical advantage afforded it by the hand wheel 70 being approximately 2 to 1. An axial counterbore 80 in the hub of the flange portion in the reel 74 opposite to the hand wheel 70 is formed with a companion set of internal teeth 82 to receive and be clutched against the teeth of the slide gear 60 to form an interengaged drive connection.

A pawl operating hand lever 84 (FIGURES 2 and 3) is pivoted at 86 to one of the side plates 22 to fulcrum about its midportion. At the lower end, it has a wedge shifting link 88 pivotally connecting it to a pawl mechanism 90 for locking the ratchet wheel 78.

In the modification of FIGURE 6, a hydraulic winch 18a carries a hand pump 92 which is handle operated by means of a handle 94 and which is mounted to a mounting plate 96 bridged between the frame side plates 22 in the winch 18a. The pump 92 has a reservoir 98 from which it delivers hydraulic fluid under pressure through an outlet 100 into a ram inlet pipe 102. A hand operated release valve 104 is included in a by-pass (not shown) interconnecting the outlet 100 and the reservoir 98 for the immediate relief of pressure in the pipe 102. The pipe 102 is directly connected to a ram cylinder 105 which extends longitudinally in the frame of the hydraulic winch 18a. The ram cylinder 105 is an integral part of the winch and also the pipe 102 is an integral part thereof whereas the hand pump 92 may be disconnected by means of a fitting at the outlet 100 and removed from the mounting plate 96 so as to be employed among several of the winches.

Figure 7:
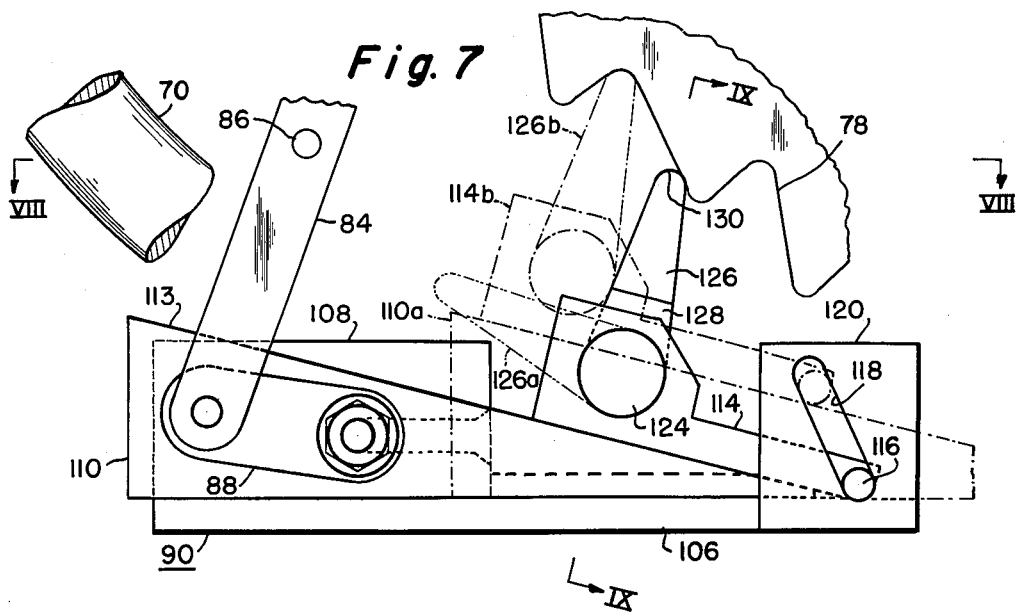
FIGURE 7 is an enlarged fragmentary view corresponding to FIGURE 2, but showing certain parts broken away for clarity.
Figure 8:
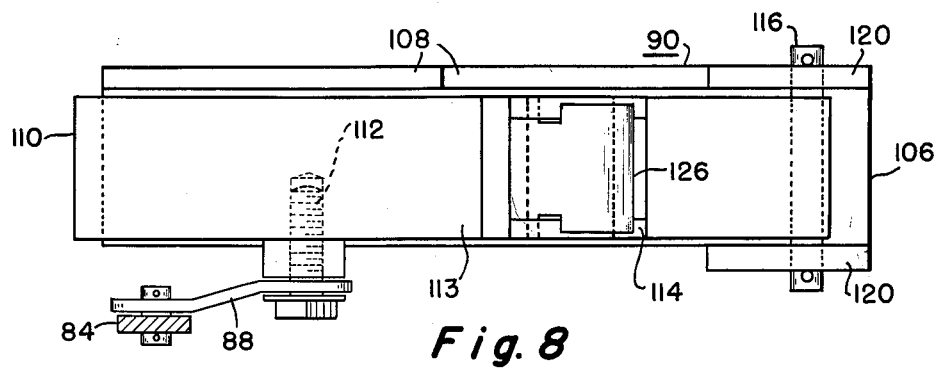
FIGURES 8 and 9 are sections taken along the lines VIII—VIII and IX—IX of FIGURE 7.
Figure 9:
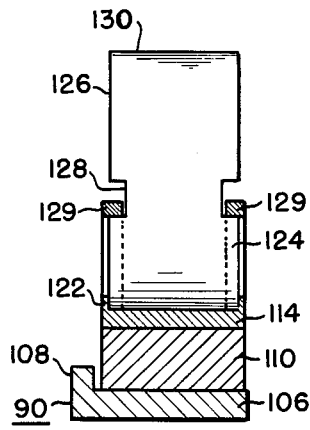

In FIGURES 7, 8 and 9 the pawl mechanism 90 includes a stationary subframe 106 having a vertical flange 108 at one side of a wedge 110 for guiding it. At the opposite side from the flange 108, the wedge 110 carries a bolt 112 pivotally securing it to the forward end of the wedge shifting link 88. The wedge 110 presents an upper wedging surface 113 slidably engaging a guided pawl mounting frame 114 which carries a cross pin 116 to guide the same in a slotted guideway 118 formed in a pair of vertical guide plates 120 affixed to the subframe 106. The guided pawl mounting frame 114 has a semi-cylindrical socket 122 approximately 120° in arcuate length which on the floor thereof receives a cylindrically shaped trunnion portion 124 forming the base of a single tooth pawl 126. The pawl 126 is of one-piece construction relieved at 128 to provide clearance for a pair of bearing cheeks 129 secured to the mounting frame 114 in which the trunnions 124 pivot. The pawl 126 has a tooth formed with a rounded nose portion 130 extending the full width of the pawl and engageable with the respective teeth on the ratchet wheel 78.

To operate the pawl mechanism 90 of FIGURES 7–9, the operator swings the pawl 126 by hand from the dotted line position 126a of FIGURE 7 into the solid line position there shown. The operator then grasps and swings the pawl operating hand lever 84 so as to shift the wedge 110 from the solid line position into the dotted line position shown by the dotted lines 110a. The guided pawl mounting frame 114 therefore raises from the solid line position shown in FIGURE 7 into the position shown by the dotted lines 114b to bring the pawl into the position shown by the dotted lines 126b where it engages the next adjacent tooth of the ratchet wheel 78. Reversal of the process retracts the pawl 126 into the solid line position shown in FIGURE 7 whereupon it is swung to the inactive position 126a free from interfering with the rotation of the ratchet wheel 78.

Inasmuch as the respective planes of the guiding surfaces of the guideways 118 and the wedging surfaces 113 of the wedging element 110 have selected inclinations in the same sense with respect to the path of movement of the wedge 110 according to FIGURE 7, a quick release action is imparted when the wedge is slidably withdrawn into the solid line position shown whereby the guided pawl mounting frame 114 is simultaneously bodily sliding toward the small end of the wedge 110.

In the modification of FIGURES 10 and 11, a hydraulic winch 18b carries a hand pump 192 which is handle operated by means of a handle 194 and which is mounted to a mounting plate 196 bridged between the frame side plates 22 in the winch 18b. The pump 192 contains a reservoir from which it delivers hydraulic fluid under pressure through an outlet 200 into a ram inlet pipe 202. A hand operated release valve 204 is included in a by-pass (not shown) interconnecting the outlet 200 and the pump reservoir for the immediate relief of pressure in the pipe 202. The pipe 202 is directly connected to a ram cylinder 205 which extends generally longitudinally of the frame of the hydraulic winch 18b. The pipe 202 is a permanent part of the winch but has sufficient flexibility to accommodate tilting movement of the ram cylinder 205 which is fixed to a pivot block 206 carried on a length of heavy bar 208 of circular cross section fixed between the plates 22. A ram 210 has an end extension protruding from the cylinder 205 and carries a pivot block 212 which forms a crankshaft throw bearing as hereinafter described.

A transverse reel shaft 58 fits in bearings (not shown) in the side plates 22 in the same manner as in the preceding embodiment and similarly carries a hand wheel (not shown) for winding the reel by hand. A crankshaft tube 214 free to oscillate and slide on the shaft 58 has a groove 216 for the clutch fork pins 66 of the same type as in the preceding embodiments. At the opposite end the tube 214 carries a sprocket or slide gear 218 for shifting it into and out of engagement with the set of teeth 82 in the reel socket to couple or clutch together the crankshaft tube and the reel.

Two spaced crank plates 220 carry a common pin 222 at their free end which passes through the eye of the pivot block 212 so that it serves as a throw bearing for the crankshaft tube. The pin 222 freely slides through the block 212 as the clutch pin 66 moves the slide gear 218 into and out of toothed engagement with the reel and the crank plates 220 give sufficient clearance to the pivot block without interfering with the alignment of the ram 210.

A pawl holder 224 is pivoted to one of a series of cross bolts 226 which hold the side plates 22 together and an adjustable pawl 228 is threaded through the pawl holder enabling the enlarged head thereof to engage the teeth of the ratchet wheel 78.

In the modification of FIGURES 12, 13, 14 and 15, a hydraulic winch 18c carries a hand pump 292 which is handle operated by means of a pump shaft adaptor plate 294 and a detachable handle (not shown) and which is secured to a mounting plate 296 bridged between the frame side plates 22 in the winch 18c. The pump 292 contains a reservoir from which it delivers hydraulic fluid under pressure through an outlet 300 into a ram inlet pipe 302 (FIGURE 13). A hand operated release valve 304 is included in a by-pass (not shown) interconnecting the outlet 300 and the pump reservoir for the immediate relief of pressure in the pipe 302. The pipe 302 is directly connected to a ram cylinder 305 which extends generally longitudinally of the frame of the hydraulic winch 18c. The pipe 302 is a permanent part of the winch but has sufficient flexibility to accommodate limited tilting movement of the ram cylinder 305 which has affixed thereto a pivot loop 306 carried on a length of heavy bar 308 of circular cross-section fixed between the plates 22.

A ram 310 has an end extension protruding from the cylinder 305 and carrying a pivot loop 312 which is supported with a rotating fit on a transverse crank pin 316 affixed to the lower end of a block shaped rocker arm 318. A transverse reel shaft 58 fits in bearings (not shown) in the side plates 22 in the same manner as in the preceding embodiments and similarly carries a keyed hand wheel 314 for winding the reel by hand. The rocker arm 318 has a transverse bore at the midportion supporting it with a rotating fit on the shaft 58 so as to oscillate independently thereof.

At the upper end the rocker arm 318 carries a dog clutch formed of a pivoted operating handle 62′ and a dog pin 322 which is supported with a sliding fit in an opening in the arm 318 and which is operated by the handle 62′ to push the head of the pin into a registering one of a ring of openings 324 formed in one of the flange portions 326 of the reel.

A threaded bolt 328 carried by the rocker arm 318 pivots the handle 62′ on a fixed axis at its lower end and at the midportion thereof the handle 62′ has a pin and slot connection 330 to the adjacent end portion of the dog pin 322. It is noted that the radius of the ring of openings 324 is substantially greater than half the diameter of the reel flange portion 326 and at this distance from the shaft 58, a dog pin of relatively small diameter has sufficient shear strength to be satisfactorily employed to transmit the desired torque into the reel.

Prior to locking the reel, the operator rotates the hand wheel 314 to draw the cable 10 hand-tight. He thereupon rotates the handle 62′ in the direction of the plane of the wheel 314 as viewed in FIGURE 12, thus driving the head of the dog pin 322 into interengaged relationship socketed within the adjacent one of the ring of opening 324. Then the operator manually operates the pump 292 causing the ram 310 to extend against the resistance of a precompressed coil return spring 332 located in the cylinder 305. The arm 318 is thereafter oscillated under the hydraulic pressure to a position shown by dotted lines 318a producing the required tension in the cable 10 and normally occurring at a point slightly short of a stop 334 which limits the power stroke of the rocker arm 318.

Locking means is provided for setting the drum in its loaded position, and comprises an assembly of spaced arms 336 which at the lower end are supported with a rotating fit on the bar 308 for limiting pivoting movement about the latter on a fixed axis. At the upper end the arms 336 are curved on the arc of a circle to wrap against the periphery of a thick socket wheel structure 338 which is precast integrally with a companion flange portion 340 opposite to the previously noted reel flange portion 326. The free ends of the arms 336 are rigidly secured together by a block shaped pawl holder 341 carried thereby which is bored and tapped and in which a screw type dog or pawl 342 is threaded. The pawl 342 is located on the opposite side of the shaft 58 from the bar 308 and at a position preferably slightly spaced from the vertical plane containing the former. Normally, the pawl 342 is disposed with its axis 344 substantially tangent to the periphery of the socket wheel structure 338 and carries a slidable handle 346 by which it is manually rotated in the axial direction.

At the inner end the pawl 342 has a ball nose 348 of semi-circular shape adapted to socket itself in a ring of locking depressions formed in the periphery of the wheel structure 338 so as to confront the pawl holder 341. This ring of depressions comprises substantially tangentially extending sockets each having a semi-spherical floor 350 at the inner end and being of a depth at the lowest point which is manifestly less than one full diameter from the nearest point on the socket wheel periphery. More precisely, the socket axes 352 extend diagonally in the direction in which the structure 338 is being urged to rotate due to the strain of the cable 10 on the reel and the axis of the engaged socket substantially coincides with the pawl axis 344 when the latter is fully socketed on the floor 350. By virtue of its diagonal angularity, the inner walls of each socket are relatively relieved at one side and the relieved or shallower side is the outermost one relative to the wheel periphery. At this shallow side, the intersection between the interrupted floor of the socket and the adjacent periphery of the socket wheel structure 338 provides a cam nose portion 354 over which the ball nose portion 348 on the head of the pawl 342 rides as the latter is radially retracted during unlocking.

As viewed in FIGURES 14 and 15, the operator unlocks the pawl 342 by rotation in a manner to make it move rightwardly along the axis 344 enabling the socket wheel structure 338 to simultaneously undergo rotation in a clockwise sense so as to follow up the retracting ball nose portion 348. Continued relative movement between the pawl 342 and the engaged socket as they relatively rotate enable them to reach a point at which a reference line R (FIGURE 15) drawn from the pivot axis of the bar 308 to their interface of contact will lie normal thereto and at this point, their axes 344 and 352 have diverged to the extent that the ball nose portion 348 occupies substantially a dead center position poised on the cam nose portion 354. Thereafter, the slightest further retractive movement of the pawl 342 enables the cam nose portion 354 to wipe therebeneath and cam it off center to an inoperative position outwardly and upwardly about the axis of bar 308. Preferably the pawl 342 is rotated a further turn or so by hand enabling it to be completely clear of the path of the sockets when the curved arms 336 return to rest upon the wheel structure 338.

At no point does the pawl 342 appreciably bind in its threads or with the walls of the socket as it moves from center position in that socket past its dead center position on the cam nose and, in fact, the smooth curved wall of the socket floor 350 enables it to ride smoothly as it shifts in relative position. The cross-sectional diameter of the pawl 342 is sufficiently less than that of the socket floor 350 to prevent the binding referred to. It will be appreciated that when the nose portion 348 is centrally socketed in one of the confronting semi-circular floors 350, the cable and drum reaction due to cable tension is such as to wrap the curved ends of the arms 336 and the pawl 342 in their direction of rotation and, therefore, excessive drum reaction merely increases the positiveness of the pawl lock.

In their commercial embodiment, the pump systems provided in the winches of the preceding figures are fitted with a conventional safety overload valve (not shown) which is preset at the factory and which functions to release pressure in the cylinder and by-pass the pump at or above a predetermined pressure without attention by the operator. In these specific installations, this overload valve amounts to a built-in means of shock absorption that relieves sudden surges due to barge to barge interaction during towing. Its automatic operation assures under all circumstances that when the maximum pressure desired is reached, the hydraulic system and the other mechanical components will thereafter be prevented from overloading and the cable 10 protected from exceeding the tension allowable within its safety factor.

In the operation of the devices of the preceding figures, a two-stage method of winching barges together is afforded. First, the cable 10 is hand tightened between the barges by means of the hand wheel 70 to take out slack in the cable; second, the hand clutch lever 62 is operated to couple together the hydraulic ram and the cable reel through the oscillatable slide gear 60 or 218 or rocker arm 318 and the hand pump is then operated for hydraulically driving the cable with maximum pulling action. The usual operational demands on an installation of this character require a total cable travel of approximately 5″ to bring the span of cable from hand-tight to the 15,000 pound tension desired to be exerted. In one embodiment of the invention, the effective leverage due to the hydraulic force amplification factor between the pump handle and the reel 74 was 380:1 and the ram piston diameter was sufficient to successfully give a thrust of approximately 20 tons, although a 30-ton ram is preferred. In the devices of FIGURES 2–5 and 6, the ratio of pinion diameter to reel pitch diameter was 1:2 and the designed ram stroke was 7″ and the consequent rack travel as set by adjusting the stops was limited to between 5″ and 6″. Thus, during the first 2½″ of rack travel the cable moved the required 5″ to exert the 15,000 pound tension exerted under maximum pulling conditions. After full tension is set the operator of the device of FIGURES 7–9 moves the pawl locking hand lever 84 with the pawl pivoted in a proper position to engage a tooth and lock the ratchet wheel 78. In the device of FIGURES 10 and 14 he pivots the pawl holder to the operating position and tightens the threaded pawl firmly against the aligned tooth of the wheel structure 78 or 338. In either case he may temporarily declutch the connection between the reel and the hydraulic ram and cylinder and then repetitively retract and advance the latter through more power strokes or part strokes to further increase the tension as required. As above indicated, however, the initial power stroke is ordinarily sufficient and then no declutching occurs or is necessary. During sustained operation in which the tension may stay on for days or weeks, minor hydraulic fluid pressure leakage will not release the tension inasmuch as the mechanical pawl mechanism stays firmly locked. With the pawl mechanism released, however, a simple twist of the knobs 41, 104, 204, or 304 on the respective release valves serves as a quick release feature as a safety measure. Otherwise, the thrust loads are adequately taken up in reaction in the hydraulic system due to its positive clutched connection to the reel drum and the contact pressure between the clutched parts holds them firmly in resisting disengagement when under such extreme tension.

As herein disclosed, the declutchable toothed and dog-type couplings embodied in the present winches affords a ready means of exerting substantial winding torque utilizing a short stroke ram. The cable is largely wound-in by hand with the coupling declutched. Clutched engagement of the coupling thereafter prevents unwinding and then the relatively slow progress of the hand-pumped ram takes place in a mere matter of inches even though the rack which it drives exerts a sizeable ultimate force to rotate the reel 74. Of course, a clutching action necessitating axial movement of the reel is undesirable in this work because of the cumulative weight of the reel and the cable therearound, and the present clutching parts utilize a sliding motion, but not the reel and reel shaft. Broadly, conventional sliding jaw clutch parts are also contemplated in lieu of the present clutching parts although the latter are preferred.

We have shown a preferred embodiment of the present invention, but it is to be understood that the principles thereof may be otherwise embodied without departing from the spirit of the invention or the scope of the following claims.

We claim:

1. Power driven winch mechanism including a frame, a transversely disposed pair of axially aligned reel and rocker arm members therein, said reel member having opposed flange portions for confining cable therebetween, a cross-shaft in said frame mounting said members for relative rotation on said axis, a power drive device mounted at one end to reciprocate longitudinally of the frame and operatively connected at the other end for oscillating said rocker arm member, means between said members including a dog clutch member and a first ring of openings in one of said flange portions which when interengaged clutch them together for locked conjoint rotation on said axis, means for causing relative shift between said reel and dog clutch members to a position interengaging said dog clutch member and said openings for transmitting drive in a path from said other end of the power drive device through the clutch means to rotate said reel member under power, and means including a locking dog member and a second ring of openings in one of said flange portions which when interengaged positively hold the reel member from rotating.

2. Winch mechanism according to claim 1 wherein the axes of said first ring of openings and the movement of said dog clutch member are transverse to one of said flange portions and wherein the axes of said openings of said second ring of openings and the movement of said locking dog member are in the plane of a different one of the flange portions on the reel member.

3. A self-contained hydraulic hand winch including a frame, a rotatably mounted reel shaft extending crosswise through the frame and projecting through one side thereof, a cable reel and an oscillatable drive member arranged side by side on the reel shaft with the reel fast thereto and the oscillatable drive member mounted for independent movement relative to the shaft and reel, a hand wheel fast to the reel shaft at the projecting end for applying manual torque to the cable reel, a hydraulic cylinder and ram mechanism extending generally longitudinally in the frame and being operatively connected at one end thereto and at the other end to said member for oscillating it on said shaft, means shiftable by hand to establish an interengaged drive connection clutching said drive member and the cable reel together including a clutch lever for selectively sliding a clutch portion into and out of engagement with the cable reel, hand pump means having an outlet connection communicating with the cylinder so as to operate said hydraulic mechanism and hydraulically drive the reel through said interengaged drive connection, mechanism to lock said reel, and release valve means connected to the pump outlet connection and effective when operated for releasing pressure in said cylinder to quickly relieve the strain on the cable reel.

4. A self-contained hydraulic hand winch mechanism including a frame, a transversely disposed pair of axially aligned cable reel and rocker arm members therein, a cross-shaft in said frame common to and coaxially mounting said pair of members for relative rotation, a mechanism to lock said reel and mechanically hold the load, a hydraulic drive device mounted at one end to reciprocate longitudinally of the frame and operatively connected at the other end for oscillating said rocker arm member, means shiftable to establish an interengaged drive connection clutching said members together including a dog clutch portion and a clutch lever connected for selectively moving said dog clutch portion into and out of engagement with said reel member, a hand pump which together with a reservoir have fluid line means for applying and exhausting pressure fluid communicated to and from said hydraulic drive device for reciprocating same to hydraulically drive said reel member through the interengaged drive means aforesaid, and quick release valve means in said fluid line means for exhausting pressure in said hydraulic drive device to quickly relieve the strain on the cable reel.

5. In a hydraulic hand-winch, a rotatably supported drum therein formed with a socket in the periphery of the drum, a generally rod-shaped pawl device, supporting means with a longitudinal bore therein having threaded engagement with said pawl device for adjustably supporting it in a confronting relation to said socket in the periphery of the drum, a hydraulic adjustment device to accurately adjust the rotated position of said drum and effective to hold said drum fast for a period of time, and means for rotating said pawl device in its threads to advance it at one end thereof into said socket for locking said drum in its hydraulically-held position, the longitudinal axis of the threads in said bore when extended to the nearest point of the periphery of said drum establishing an obliqueness of angularity of intersection therewith whereby a substantial component of the motion of adjustment of said pawl device within the socket is in the direction of rotative adjustment of said drum by said hydraulic device whereby each device is independently operable to relieve the other from holding the load, said socket also having an axis disposed at substantially the obliqueness of angularity of and in a like sense as the thread axis, with respect to said drum periphery.

References Cited in the file of this patent

UNITED STATES PATENTS

| | | |
|---|---|---|
| 118,031 | Lucius | Aug. 15, 1871 |
| 222,675 | Davey | Dec. 16, 1879 |
| 247,680 | O'Hanlon | Sept. 27, 1881 |
| 1,195,007 | Harris | Aug. 15, 1916 |
| 1,429,815 | Wels | Sept. 19, 1922 |
| 1,892,829 | Choate | Jan. 3, 1933 |
| 2,170,504 | Messer | Aug. 22, 1939 |
| 2,233,703 | Hatch | Mar. 4, 1941 |
| 2,353,562 | Hatcher | July 11, 1944 |
| 2,521,191 | Stanland | Sept. 5, 1950 |
| 2,553,630 | Capetta | May 22, 1951 |
| 2,555,635 | Dickerman | June 5, 1951 |
| 2,594,076 | Schlein | Apr. 22, 1952 |
| 2,684,653 | Dyer | July 27, 1954 |
| 2,687,785 | Whitney | Aug. 31, 1954 |
| 2,703,220 | Curtiss | Mar. 1, 1955 |
| 2,722,907 | Dyer | Nov. 8, 1955 |
| 2,727,724 | Biebighauser | Dec. 20, 1955 |
| 2,732,180 | Gratzmuller | Jan. 24, 1956 |
| 2,796,769 | Gratzmuller | June 25, 1957 |